United States Patent
Solozabal et al.

(10) Patent No.: US 10,830,355 B2
(45) Date of Patent: Nov. 10, 2020

(54) RUBBER COATED METAL SEAL WITH INTEGRATED INNER SEAL AND OUTER SEAL PORTIONS

(71) Applicant: GM Global Technology Operations LLC, Detroit, MI (US)

(72) Inventors: Ricardo Solozabal, Lake Orion, MI (US); Michael P. Fannin, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 97 days.

(21) Appl. No.: 16/241,250

(22) Filed: Jan. 7, 2019

(65) Prior Publication Data

US 2020/0217417 A1    Jul. 9, 2020

(51) Int. Cl.
*F16J 15/08* (2006.01)

(52) U.S. Cl.
CPC ....... *F16J 15/0806* (2013.01); *F16J 15/0818* (2013.01); *F16J 15/0887* (2013.01); *F16J 2015/0856* (2013.01)

(58) Field of Classification Search
CPC .. F16J 15/0806; F16J 15/0818; F16J 15/0887; F16J 2015/085; F16J 2015/0856
See application file for complete search history.

(56) References Cited

U.S. PATENT DOCUMENTS

| | | | |
|---|---|---|---|
| 5,582,415 A * | 12/1996 | Yoshida | F16J 15/0825 277/592 |
| 5,938,208 A * | 8/1999 | Yoshida | F16J 15/0818 277/592 |
| 2005/0093248 A1* | 5/2005 | Udagawa | F16J 15/0818 277/594 |
| 2017/0248232 A1* | 8/2017 | Plunkett | F16J 15/061 |
| 2018/0119818 A1* | 5/2018 | Ide | F16J 15/0825 |

\* cited by examiner

*Primary Examiner* — Gilbert Y Lee

(57) ABSTRACT

A gasket includes a first compressible portion, a second incompressible portion integrally formed with the first compressible portion, and a flexible coating disposed on one or more of the first compressible portion and the second incompressible portion. The first compressible portion is substantially planar and includes a plurality of layers, and the second incompressible portion is substantially planar and includes a first of the plurality of layers.

18 Claims, 4 Drawing Sheets

RUBBER COATED METAL SEAL WITH INTEGRATED INNER SEAL AND OUTER SEAL PORTIONS

INTRODUCTION

The present disclosure relates to gaskets, and more particularly to rubber-coated gasket materials having a rubber layer formed on one or both sides of a metallic sheet. Gaskets formed of this material not only has sealing capability, but are adapted for use under hostile conditions such as those where repeated impact and/or abrasion are exerted by other parts. Rubber-coated gasket materials are commonly fabricated by punching or stamping desired shapes from a sheeting having a rubber coat formed on the surface of a metal substrate, such as one or more sheets of cold-rolled steel, stainless steel, or aluminum. The fabricated materials are used as gaskets in various apparatuses and machines. Because metal sheets are used as substrates, the rubber-coated gaskets prevent leakage of gasses or fluids under pressure. In addition, the elasticity of the rubber layer enables the gasket to closely fit any irregularities which may be found in the surface of a flange and thereby insures reliable sealing properties. Rubber-coated gaskets, therefore, can provide a reliable seal between two surfaces.

However, while current gaskets achieve their intended purpose, there is a need for a new and improved gasket system that provides improved flexibility and applicability, reduced costs, reduced manufacturing and assembly complexity, and improved safety and assembly accuracy.

SUMMARY

According to several aspects of the present disclosure a gasket includes a first compressible portion, a second incompressible portion integrally formed with the first compressible portion, and a flexible coating disposed on one or more of the first compressible portion and the second incompressible portion. The first compressible portion is substantially planar and includes a plurality of layers, and the second incompressible portion is substantially planar and includes a first of the plurality of layers.

In another aspect of the present disclosure the plurality of layers comprise a metallic carrier layer disposed overtop a first plurality of metallic sealing layers, and a second plurality of metallic sealing layers are disposed overtop the metallic carrier layer opposite the first plurality of metallic sealing layers.

In another aspect of the present disclosure the first plurality of metallic sealing layers and the metallic carrier layer are congruent.

In another aspect of the present disclosure one or more of the second plurality of metallic sealing layers and the metallic carrier layer are congruent.

In another aspect of the present disclosure the flexible coating is disposed on one of the first plurality of metallic sealing layers, and the flexible coating is disposed on one of the second plurality of metallic sealing layers.

In another aspect of the present disclosure the first of the plurality of metallic sealing layers includes a first gasket portion congruent with the first compressible portion, and a second gasket portion extending radially outward from the first gasket portion.

In another aspect of the present disclosure the first gasket portion and the second gasket portion are connected to each other by one or more bridges.

In another aspect of the present disclosure the first compressible portion and the second incompressible portion define one or more locator apertures, each of the one or more locator apertures sized and shaped to accept a locator pin.

In another aspect of the present disclosure the first compressible portion engages a compressible gap between two or more sealing surfaces and the second incompressible portion engages with an incompressible gap between two or more sealing surfaces.

In another aspect of the present disclosure first compressible portion and the second incompressible portion are formed by progressive die stamping, and the flexible coating is deposited on the gasket by screen printing.

In another aspect of the present disclosure a gasket sealing a transmission housing to a fluid pump includes a first compressible portion, a second incompressible portion integrally formed with the first compressible portion, and a flexible coating, the flexible coating screen printed onto one or more of the first compressible portion and the second incompressible portion. The first compressible portion is substantially planar and includes a plurality of layers progressively die stamped layers, and the second incompressible portion is substantially planar and includes a first of the plurality of layers.

In another aspect of the present disclosure the plurality of layers include a metallic carrier layer disposed overtop a first plurality of metallic sealing layers, and a second plurality of metallic sealing layers are disposed overtop the metallic carrier layer opposite the first plurality of metallic sealing layers, and wherein the metallic carrier layer has a first thickness and each of the first plurality of metallic sealing layers and each of the second plurality of metallic sealing layers has a second thickness, wherein the first thickness is greater than the second thickness.

In another aspect of the present disclosure the first plurality of metallic sealing layers and the metallic carrier layer are congruent, and one or more of the second plurality of metallic sealing layers and the metallic carrier layer are congruent.

In another aspect of the present disclosure the flexible coating is disposed on one of the first plurality of metallic sealing layers, and the flexible coating is disposed on one of the second plurality of metallic sealing layers.

In another aspect of the present disclosure the first of the plurality of metallic sealing layers includes a first gasket portion congruent with the first compressible portion, and a second gasket portion extending radially outward from the first gasket portion.

In another aspect of the present disclosure the first gasket portion and the second gasket portion are connected to each other by one or more bridges.

In another aspect of the present disclosure the first compressible portion and the second incompressible portion define one or more locator apertures, each of the one or more locator apertures sized and shaped to accept a locator pin.

In another aspect of the present disclosure the first compressible portion engages a compressible gap between two or more sealing surfaces and the second incompressible portion engages with an incompressible gap between two or more sealing surfaces.

In another aspect of the present disclosure the second incompressible portion seals an incompressible gap between the transmission housing and a pump housing of the fluid pump, and wherein the first compressible portion seals a compressible gap between a pump body of the fluid pump and the transmission housing.

In another aspect of the present disclosure a gasket forming a fluid resistant seal between a first housing the a second housing, the gasket including a first compressible portion sealingly engaging with one or more compressible gaps between the first housing and the second housing, a second incompressible portion integrally formed with the first compressible portion and sealingly engaging with one or more incompressible gaps between the first housing and the second housing, and a flexible coating, the flexible coating screen printed onto one or more of the first compressible portion and the second incompressible portion. The first compressible portion is substantially planar and includes a plurality of layers progressively die stamped layers, and the second incompressible portion is substantially planar and includes a first of the plurality of layers, the plurality of layers includes a metallic carrier layer disposed overtop a first plurality of metallic sealing layers, and a second plurality of metallic sealing layers are disposed overtop the metallic carrier layer opposite the first plurality of metallic sealing layers. The metallic carrier layer has a first thickness and each of the first plurality of metallic sealing layers and each of the second plurality of metallic sealing layers has a second thickness, the first thickness is greater than the second thickness, the first plurality of metallic sealing layers and the metallic carrier layer are congruent, and one or more of the second plurality of metallic sealing layers and the metallic carrier layer are congruent. The first of the plurality of metallic sealing layers includes a first gasket portion congruent with the first compressible portion, and a second gasket portion extending radially outward from the first gasket portion, the first gasket portion and the second gasket portion are connected to each other by one or more bridges, and the first compressible portion and the second incompressible portion define one or more locator apertures, each of the one or more locator apertures sized and shaped to accept a locator pin.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
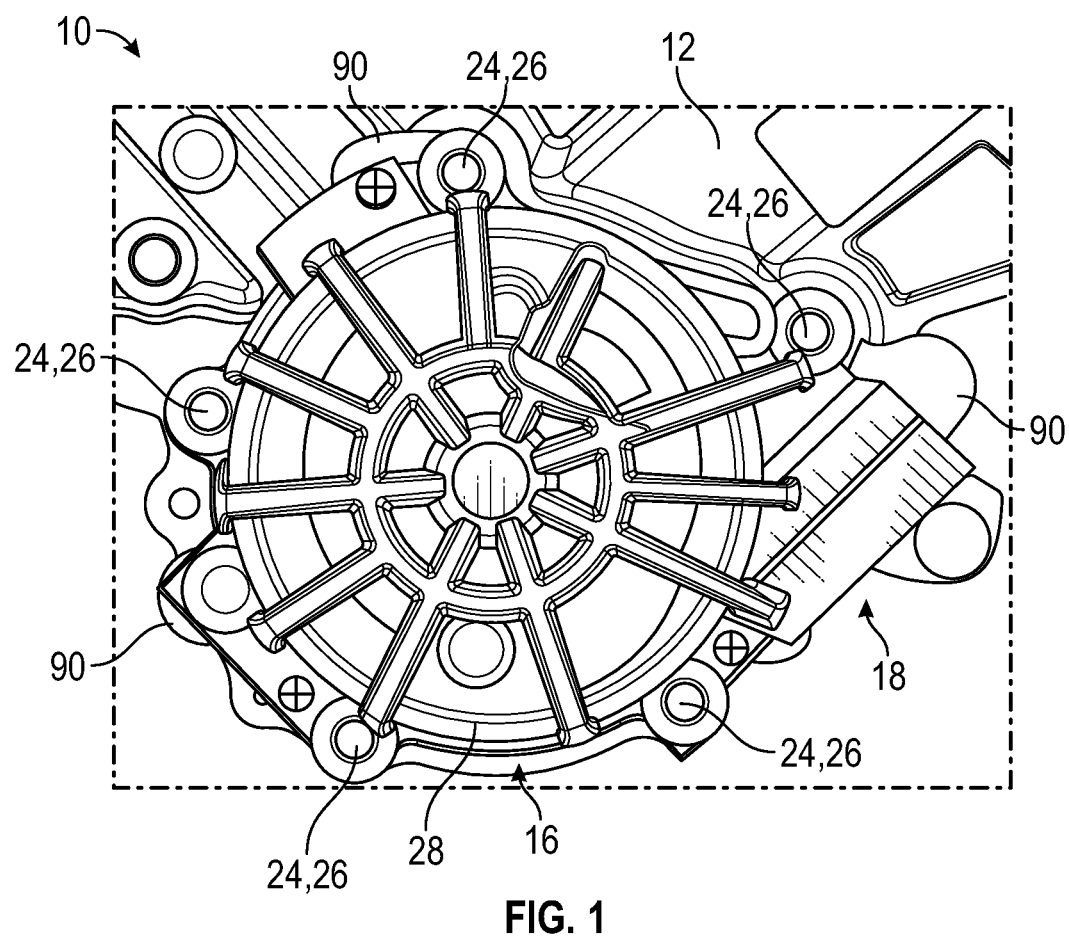
FIG. 1 is a perspective view of a portion of a transmission assembly including a rubber coated metal gasket with integrated inner and outer seal portions according to an aspect of the present disclosure.

Referring now to FIG. 1, a portion of a transmission assembly embodying the principles of the present disclosure is shown and generally indicated by reference number 10. The transmission assembly 10 includes a transmission housing 12 supporting and enclosing a plurality of mechanical components. In several aspects, the mechanical components include an input shaft (not shown), an output shaft (not shown), a plurality of drive mechanisms (not shown) including gears, clutches, torque converters, continuously variable transmission (CVT) belts or chains, or the like. The mechanical components of the transmission assembly 10 are lubricated by, and in some examples driven by, a lubricating fluid such as transmission fluid, gear oil, or the like. The mechanical components of the transmission assembly 10 may also include a variety of drive mechanisms 14, such as spline shafts, sprockets, gear drives, chain drives, belt drives, or the like, for transmission accessories. In order to circulate the lubricating fluid through the transmission assembly 10, the transmission assembly 10 is equipped with one or more fluid pumps 16. In several aspects, the fluid pumps 16 are driven by one or more of the drive mechanisms 14. In the example of FIG. 1, the fluid pump 16 is driven by a spline shaft 14, however, it should be appreciated that the fluid pump 16 may be driven by a variety of mechanical, hydraulic, electrical, or pneumatic devices. The fluid pump 16 draws lubricating fluid from a reservoir or sump (not specifically shown), generally located near a bottom of the transmission, and feeds the lubricating fluid into a hydraulic system of the transmission assembly 10 via one or more fluid conduits 18, pipes, or the like. In some examples, the fluid pump 16 feeds lubricating fluid into a transmission cooler (not shown), the torque converter (not shown), hydraulic fluid controls (not shown), and shift actuation members (not shown). Furthermore, it should be appreciated that in some examples, the fluid pump 16 is remotely located in relation to the transmission assembly 10, and in fluid communication with the transmission assembly 10 via one or more fluid ports, conduits 18, pipes, or the like.

The spline shaft 14 extends through a first aperture 20 formed in the transmission housing 12. The first aperture 20 extends radially outward from the spline shaft 14 and includes one or more fluid ports or conduits 18. Surrounding the first aperture 20, the transmission housing 12 has a first sealing surface 22. The first sealing surface 22 is a substantially planar, smooth, and continuous surface extending for a first distance "D1" radially outward from the first aperture 20. In several aspects, the first sealing surface 22 also surrounds one or more first attachment features 24. In some examples, the first attachment features 24 include studs, pins, dowels, bolts, nuts, screws, threaded apertures, or the like, and the first pump attachment features 24 are optimized to engage with and attach the fluid pump 16 to the transmission housing 12 via one or more second attachment features 26. The second attachment features 26, like the first attachment features 24, may include studs, pins, dowels, bolts, nuts, screws, threaded apertures, smooth bore apertures, or the like. The second attachment features 26 are paired with the first attachment features 24 to firmly affix the fluid pump 16 to the transmission housing 12. In an example, the first attachment features 24 are studs, and the second attachment features 26 include smooth bore apertures sized to accept the studs 24, as well as nuts 26 sized and shaped to enter into threaded engagement with the studs 24 and to thereby affix the fluid pump 16 to the transmission housing 12.

The fluid pump 16 includes a pump housing 28 supporting a pump body 30. In several aspects, the pump body 30 includes a plurality of internal components such as a pump rotor 32, a pump vane 34, a rotor guide 36, pump vane rings 38, and the like. It should be appreciated, however, that the precise mechanical componentry of the fluid pump 16 may vary substantially from application to application, and that the pump rotor 32, pump vane 34, rotor guide 36, and vane rings 38 are discussed merely as an illustration of exemplary components of one type of fluid pump 16. Additionally, the spline shaft 14 is rotatably supported within a receiving portion 40 of the pump housing 28. The receiving portion 40 may include one or more spline shaft 14 support bearings 42 optimally sized, shaped, and constructed to provide freedom of rotation to the spline shaft 14 once the spline shaft 14 is engaged within and supported by the receiving portion 40 of the pump housing 28.

The pump housing 28 defines a second aperture 44 substantially similar in size and shape to the first aperture 20. Moreover, the pump housing 28 includes a second sealing surface 46 extending outward from the second aperture 44. The second sealing surface 46 is a substantially planar, smooth, and continuous surface extending for a second distance "D2" radially outward from the second aperture 44. In several aspects, the second sealing surface 46 also surrounds one or more second pump attachment features 26. Accordingly, when the pump housing 28 is assembled with the transmission housing 12 via the first and second attachment features 24, 26, the first and second sealing surfaces 22, 46 lie substantially flush against one another. However, due to manufacturing tolerances, assembly tolerances, and the like, and because the fluid pump 16 pressurizes lubricating fluid within the pump housing 28 and supplies the pressurized lubricating fluid via conduits 18 to the transmission assembly 10, the first and second sealing surfaces 22, 46 may not adequately seal against one another. Accordingly, a gasket 48 is positioned between the transmission housing 12 and the fluid pump 16 and forms a seal between the transmission housing 12 and the fluid pump 16. That is, gasket 48 prevents leakage of lubricating fluid, such as transmission fluid, gear oil, coolant, or the like between the first and second sealing surfaces 22, 46 when the transmission assembly 10 is in use. to one or the other of the transmission housing 12 or the fluid pump 16 during assembly.

Figure 2:
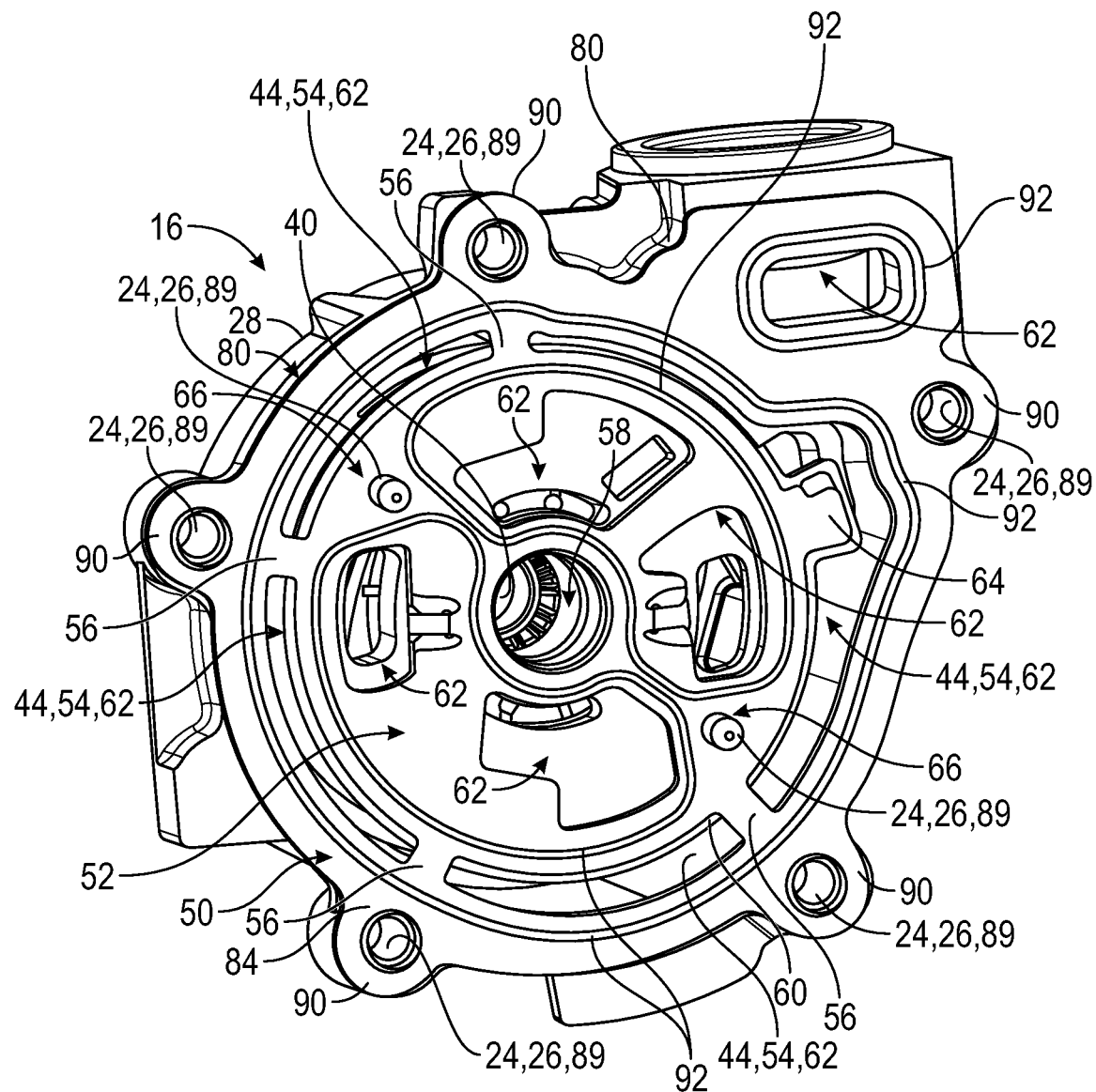
FIG. 2 is a perspective top view a rubber coated metal gasket with integrated inner and outer seal portions installed on a fluid pump according to an aspect of the present disclosure.
Figure 3:
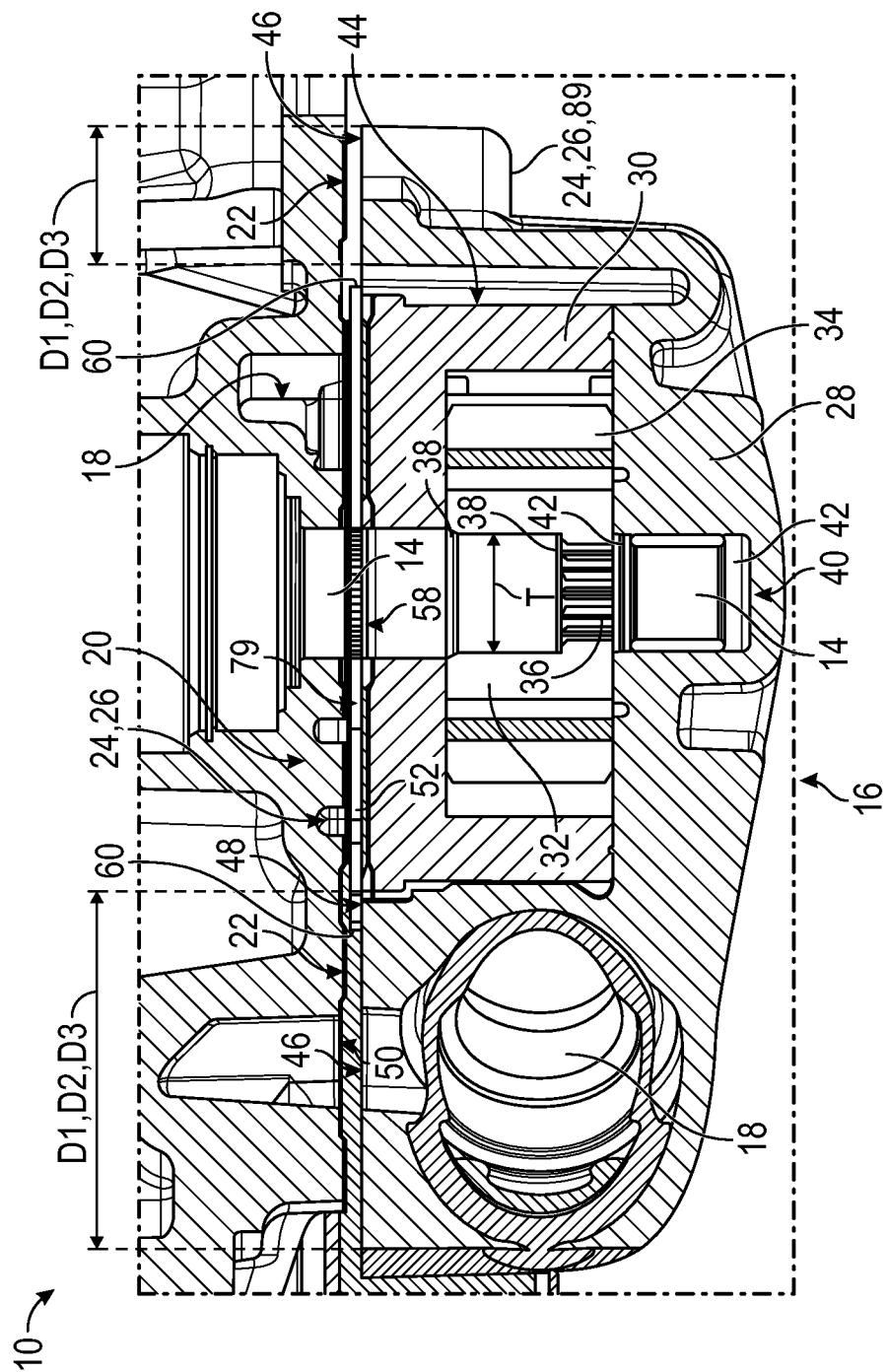
FIG. 3 is a cross sectional view of a fluid pump partially installed to a transmission assembly with a rubber coated metal gasket with integrated inner and outer seal portions disposed therebetween according to an aspect of the present disclosure.
Figure 4:
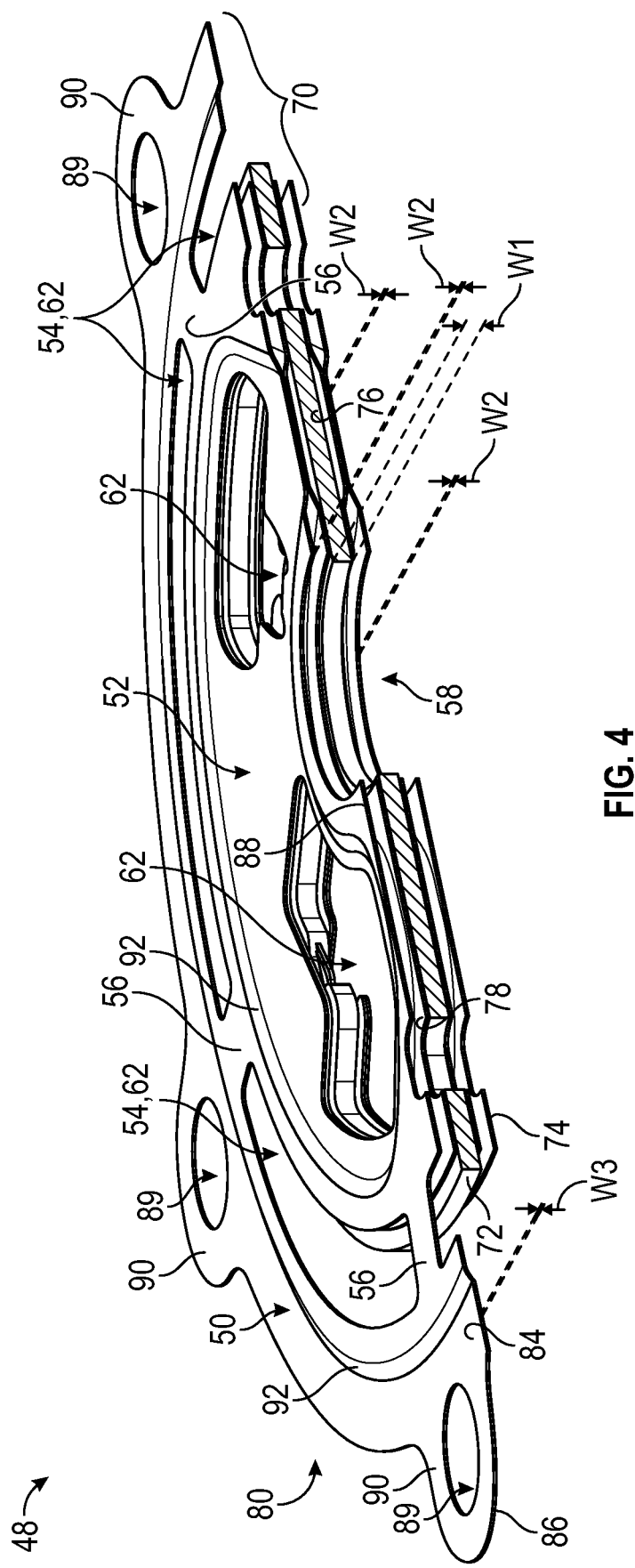
FIG. 4 is a cross sectional view of a rubber coated metal gasket with integrated inner and outer seal portions according to an aspect of the present disclosure.

Turning now to FIGS. 2-4, and with continuing reference to FIG. 1, the gasket 48 is substantially planar and includes a first gasket portion 50 and a second gasket portion 52. The first gasket portion 50 has a footprint substantially similar to the first and second sealing surfaces 22, 46. That is, when aligned with the first and second sealing surfaces 22, 46, the first gasket portion 50 defines a third aperture 54 substantially congruent with the first aperture 20 and the second aperture 44. The first gasket portion 50 extends radially outward from the third aperture 54 for a third distance "D3" substantially similar to the first and second distances, "D1, D2". Moreover, the first gasket portion 50 surrounds the first and/or second pump attachment features 24, 26. In some examples, the third distance "D3" is slightly greater than both the first and second distances "D1, D2". When the third distance "D3" is greater than the first and second distances "D1, D2", the gasket 48 may be more easily located or placed into alignment with the transmission housing 12 and the pump housing 28 such that the spline shaft 14 can protrude through the gasket 48 into the pump housing 28 and engage with the fluid pump 16.

The second gasket portion 52 is sized and shaped to engage with the pump body 30 within the pump housing 28. Accordingly, the second gasket portion 52 is disposed within the third aperture 54. The second gasket portion 52 is formed unitarily with the first gasket portion 50 and is interconnected with the first gasket portion 50 via one or more bridges 56. In several aspects, the second gasket portion 52 has a fourth aperture 58 sized and shaped to accept the spline shaft 14 of the transmission assembly 10. More specifically, the fourth aperture 58 is slightly larger than a diameter or thickness "T" of the spline shaft 14, thereby allowing the spline shaft 14 to rotate without contacting the second gasket portion 52. The second gasket portion 52 extends radially outward from the fourth aperture 58 to an outer diameter 60 disposed proximate to but spaced apart from the first gasket portion 50. The bridges 56 extend radially outward from the outer diameter 60 of the second gasket portion 52 to the first gasket portion 50. It should be appreciated that while in FIG. 2 four bridges 56 are depicted, the precise number and dimensions of the bridges 56 may vary substantially from application to application, and such variations are within the scope and intent of the present disclosure. That is, the radial length, annular width, and other such dimensions, as well as the shapes of the bridges 56 may vary substantially from application to application. In several aspects, the second gasket portion 52 includes a plurality of fluid apertures 62. The fluid apertures 62 are optimally sized and shaped to provide a means by which lubricating fluid may enter and/or exit the fluid pump 16. Moreover, the second gasket portion 52 may include one or more locator tabs and/or anti-rotation features 64, as well as one or more locator apertures 66. When the gasket 48 is assembled with the pump 16 and the transmission housing 12, the locator tabs and/or anti-rotation features 64 aid in aligning the gasket 48 with the pump housing 28 and/or the transmission housing 12. Additionally, the anti-rotation features 64 prevent the gasket 48 from rotating when the gasket 48 is in sealing engagement with the pump body 30 via the second gasket portion 52. That is, the anti-rotation features 64 resist torques imparted to the second gasket portion 52 via the pump body 30 and/or the spline shaft 14. In some examples, the locator apertures 66 are sized and located to accept locator features 68 such as locator pins or dowels, bolts, studs, or the like which protrude axially from the pump body 30, the transmission housing 12, the pump housing 16, or any combination thereof. Accordingly, the locator apertures 66 allow the gasket 48 to be attached to the pump 16 or the transmission housing 12 during assembly such that the gasket 48 is accurately aligned with the first and second sealing surfaces 22, 46, as well as with the pump body 30. In some examples, the locator apertures 66 and locator features 68 are radially and/or annularly asymmetrically located about on the first and/or second gasket portions 50, 52 so that the gasket 48 may only be assembled with the transmission housing 12 and the fluid pump 16 in a single orientation, thus improving accuracy of assembly, and improving the potential for forming a complete seal between the transmission housing 12 and the fluid pump 16.

With particular reference to FIG. 4, and with continuing reference to FIGS. 1-3, the gasket 48 is formed via a plurality of substantially planar component layers 70. In several aspects, the gasket 48 is formed via a progressive die stamping process in which each of the substantially planar component layers 70 is stamped out of a sheet of stock material and then bonded or otherwise located to subsequent layers 70, each of which is similarly stamped out of stock material. In some examples, the gasket 48 includes a substantially rigid carrier layer 72 supporting at least a first sealing layer 74, a second sealing layer 76, and a third sealing layer 78. It should be appreciated, however, that the carrier layer 72 is included in some applications, but not in others. That is, depending on the application, the carrier layer 72 may or may not be required for a variety of reasons, including structural and packaging constraints. Each of the carrier layer 72, and first, second, and third sealing layers 74, 76, 78 is formed from metallic materials such as steel, iron, aluminum, or alloys thereof. In some examples, one or more of the first, second, and third sealing layers 74, 76, 78 and the rigid carrier layer 72 or pressure plate is formed of a composite material. It should be appreciated that the material composition of each of the component layers of the gasket 48 may vary substantially depending on the application. That is, the carrier layer 72 and/or the first and/or second and/or third sealing layers 74, 76, 78 may be formed of the materials cited above or other similar materials in accordance with the design parameters of a given application. The first, second, and third sealing layers 74, 76, 78, and the carrier layer 72 are substantially congruent with each other, and with a third sealing surface 79 of the pump body 30. In several aspects, the carrier layer 72 is thicker in an axial direction than any of the first, second, and third sealing layers 74, 76, 78. That is, the carrier layer 72 has a first thickness "W1" thicker than a second thickness "W2" of each of the first, second, and third sealing layers 74, 76, 78. It should be appreciated that the first and second thicknesses "W1, W2" may be identical or may vary substantially between the first, second, and third sealing layers 74, 76, 78, or any combination thereof. That is, in some examples, the first, second, and third sealing layers 74, 76, 78 have second thicknesses "W2" which are identical to one another, while in other examples, the first, second, and third sealing layers 74, 76, 78 have second thicknesses "W2" at least some of which are different from one another.

A cover layer or cover plate 80 is disposed overtop the third sealing layer 78. The cover plate 80 is a very rigid substantially planar component layer 70 stamped from a sheet of stock material and subsequently bonded or otherwise located to the third sealing layer 78. The cover plate 80 is also axially very thin. That is, the cover plate 80 is thinner in an axial direction than any of the first, second, and third sealing layers 74, 76, 78, and the carrier layer 72. Thus, a third thickness "W3" of the cover plate 80 is smaller than either the first thickness "W1" or the second thickness "W2". The cover layer 80 extends radially outward from the fourth aperture 58 to an outer edge 82 of the gasket 48. Therefore, the cover layer 80 extends in a planar fashion for the entirety of the first gasket portion 50 and the second gasket portion 52. An upper surface 84 of first gasket portion 50 of the cover layer 80 sealingly engages with the transmission housing 12, while a lower surface 86 of the first gasket portion 50 of the cover layer 80 sealingly engages with the pump housing 28. A lower surface 88 of the cover layer 80 congruent with the second gasket portion 52 is bonded or otherwise located to the third sealing layer 78. Moreover, it should be appreciated that while in the foregoing description the gasket 48 has been described as having a five layers 70 including the carrier layer 72, first, second, and third sealing layers 74, 76, 78, and a cover layer 80, that the quantity of layers 70 may vary substantially from application to application without departing from the scope or intent of the present disclosure.

The cover layer 80 extends outwards towards and defines attachment apertures 89 surrounding the attachment features 24 when the cover layer 80 is assembled with the fluid pump 16 and the transmission housing 12. Thus, when the gasket 48 is assembled with the transmission housing 12 and the pump housing 28, the gasket 48 extends slightly beyond the attachment features 24 and in some examples, slightly beyond the footprint of the pump housing 28. Because the cover layer 80 is thin and rigid, it is therefore possible under some circumstances for the cover layer 80 to protrude into empty space in some areas. The thin, rigid protrusions or ears 90 of the cover layer 80 in such areas can pose a safety risk to individuals assembling or working on the transmission assembly 10, the fluid pump 16, or the like. Accordingly, because the locator apertures 66 and locator features 68 extend through both the first gasket portion 50 and the second gasket portion 52 and serve to locate the cover layer 80 of the gasket 48 precisely, the distance to which the ears 90 extend beyond the footprint of the pump housing 28 may be reduced or eliminated entirely. Accordingly, the reduction in ear 90 size decreases the risk of injury to individuals working on the transmission assembly 10 and/or fluid pump 16.

A rubber coating 92 is disposed on at least a portion of the cover layer 80 of the gasket 48. The rubber coating 92 may be applied to the cover layer 80 in any of a variety of different ways without departing from the scope or intent of the present disclosure. In one example, the rubber coating 92 is applied at predetermined locations on the cover layer 80 where it has been determined that an improved sealing engagement between the gasket 48, the fluid pump 16 and the transmission assembly 10 or transmission housing 12 is optimal. In some examples, the rubber coating 92 is applied to the cover layer 80 and substantially surrounds each of the first, second, third, fourth, fluid, and locator apertures 20, 44, 54, 58, 62, 66 and proximate the attachment features 24. Additional rubber coating 92 may be applied in other areas where it has been determined that sealing engagement between the transmission assembly or housing 10, 12, and the fluid pump 16 via the gasket 48 is needed without departing from the scope or intent of the present disclosure. In some aspects, the rubber coating 92 is applied to the first sealing layer 74 and substantially surrounds the first, second, third, fourth, fluid, and locator apertures 20, 44, 54, 58, 62, 66, and attachment features 24 in a manner substantially similar to the rubber coating 92 applied to the cover layer 80. The rubber coating 92 is applied to the gasket 48 via any of a variety of methods such as screen printing, 3-D printing, transfer molding, injection molding, adhesives, or the like.

A gasket 48 of the present disclosure offers several advantages, including ease of production, simplicity of design and manufacturing, low cost, low complexity, improved stability and ease of assembly, portability, and improved safety. Moreover, while the gasket 48 of the present disclosure has been described with respect to a fluid pump 16 and a transmission assembly 10, it should be appreciated that a gasket 48 having substantially the same design can be used in any application in which two sealing surfaces are being joined, wherein the two sealing surfaces include one or more fixed gaps to be sealed by the first gasket portion 50, or the cover layer 80 alone, and one or more compressible gaps to be sealed by the second gasket portion 52.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A gasket comprising:
a first compressible portion;

a second incompressible portion integrally formed with the first compressible portion; and
a flexible coating disposed on one or more of the first compressible portion and the second incompressible portion,
wherein the first compressible portion is substantially planar and includes a plurality of layers, and the second incompressible portion is substantially planar and includes a first of the plurality of layers;
one or more bridges extending radially outwards from the first gasket portion to the second incompressible gasket portion, and connecting the first compressible portion and the second incompressible portion; and
a plurality of fluid apertures formed through the first compressible portion between each of the one or more bridges and an adjacent one of the one or more bridges.

2. The gasket of claim 1 wherein the plurality of layers comprise a metallic carrier layer disposed overtop a first plurality of metallic sealing layers, and wherein a second plurality of metallic sealing layers are disposed overtop the metallic carrier layer opposite the first plurality of metallic sealing layers.

3. The gasket of claim 2 wherein the first plurality of metallic sealing layers and the metallic carrier layer are congruent.

4. The gasket of claim 2 wherein one or more of the second plurality of metallic sealing layers and the metallic carrier layer are congruent.

5. The gasket of claim 2 wherein the flexible coating is disposed on one of the first plurality of metallic sealing layers, and the flexible coating is disposed on one of the second plurality of metallic sealing layers.

6. The gasket of claim 2 wherein a first of the plurality of metallic sealing layers includes a first gasket portion congruent with the first compressible portion, and the second incompressible gasket portion extends radially outward from the first gasket portion.

7. The gasket of claim 1 wherein the first compressible portion and the second incompressible portion define one or more locator apertures, each of the one or more locator apertures sized and shaped to accept a locator pin.

8. The gasket of claim 1 wherein the first compressible portion engages a compressible gap between two or more sealing surfaces and the second incompressible portion engages with an incompressible gap between two or more sealing surfaces.

9. The gasket of claim 1 wherein first compressible portion and the second incompressible portion are formed by progressive die stamping, and the flexible coating is deposited on the gasket by screen printing.

10. A gasket sealing a transmission housing to a fluid pump, the gasket comprising:
a first compressible portion;
a second incompressible portion integrally formed with the first compressible portion; and
a flexible coating, the flexible coating screen printed onto one or more of the first compressible portion and the second incompressible portion,
wherein the first compressible portion is substantially planar and includes a plurality of layers progressively die stamped layers, and the second incompressible portion is substantially planar and includes a first of the plurality of layers;
one or more bridges extending radially outwards from the first gasket portion to the second gasket portion, and connecting the first compressible portion and the second incompressible portion; and
a plurality of fluid apertures formed through the first compressible portion between each of the one or more bridges and an adjacent one of the one or more bridges.

11. The gasket of claim 10 wherein the plurality of layers comprise a metallic carrier layer disposed overtop a first plurality of metallic sealing layers, and a second plurality of metallic sealing layers are disposed overtop the metallic carrier layer opposite the first plurality of metallic sealing layers, and wherein the metallic carrier layer has a first thickness and each of the first plurality of metallic sealing layers and each of the second plurality of metallic sealing layers has a second thickness, wherein the first thickness is greater than the second thickness.

12. The gasket of claim 11 wherein the first of the plurality of metallic sealing layers includes a first gasket portion congruent with the first compressible portion, and a second gasket portion extending radially outward from the first gasket portion.

13. The gasket of claim 12 wherein the first plurality of metallic sealing layers and the metallic carrier layer are congruent, and one or more of the second plurality of metallic sealing layers and the metallic carrier layer are congruent.

14. The gasket of claim 13 wherein the flexible coating is disposed on one of the first plurality of metallic sealing layers, and the flexible coating is disposed on one of the second plurality of metallic sealing layers.

15. The gasket of claim 10 wherein the first compressible portion and the second incompressible portion define one or more locator apertures, each of the one or more locator apertures sized and shaped to accept a locator pin.

16. The gasket of claim 10 wherein the first compressible portion engages a compressible gap between two or more sealing surfaces and the second incompressible portion engages with an incompressible gap between two or more sealing surfaces.

17. The gasket of claim 10, wherein the second incompressible portion seals an incompressible gap between the transmission housing and a pump housing of the fluid pump, and wherein the first compressible portion seals a compressible gap between a pump body of the fluid pump and the transmission housing.

18. A gasket forming a fluid resistant seal between a first housing the a second housing, the gasket comprising:
a first compressible portion sealingly engaging with one or more compressible gaps between the first housing and the second housing;
a second incompressible portion integrally formed with the first compressible portion and sealingly engaging with one or more incompressible gaps between the first housing and the second housing; and
a flexible coating, the flexible coating screen printed onto one or more of the first compressible portion and the second incompressible portion,
wherein the first compressible portion is substantially planar and includes a plurality of layers progressively die stamped layers, and the second incompressible portion is substantially planar and includes a first of the plurality of layers, the plurality of layers includes a metallic carrier layer disposed overtop a first plurality of metallic sealing layers, and a second plurality of metallic sealing layers are disposed overtop the metallic carrier layer opposite the first plurality of metallic sealing layers, the metallic carrier layer has a first thickness and each of the first plurality of metallic sealing layers and each of the second plurality of metallic sealing layers has a second thickness, the first thickness is greater than the second thickness, the first plurality of metallic sealing layers and the metallic carrier layer are congruent, and one or more of the second plurality of metallic sealing layers and the metallic carrier layer are congruent, the first of the plurality of metallic sealing layers includes a first gasket portion congruent with the first compressible portion, and a second gasket portion extending radially outward from the first gasket portion;

one or more bridges extending radially outwards from the first gasket portion to the second gasket portion, and connecting the first compressible portion and the second incompressible portion;

one or more locator apertures, the first compressible portion and the second incompressible portion defining the one or more locator apertures, each of the one or more locator apertures sized and shaped to accept a locator pin; and a plurality of fluid apertures formed through the first compressible portion between each of the one or more bridges and an adjacent one of the one or more bridges.

* * * * *